United States Patent
Miller et al.

(10) Patent No.: US 10,057,267 B1
(45) Date of Patent: Aug. 21, 2018

(54) INTEGRATING EXTERNAL DEVICES WITH PRIVATE NETWORKS IN PROVIDER NETWORK ENVIRONMENTS

(71) Applicant: Amazon Technologies, Inc., Seattle, WA (US)

(72) Inventors: Kevin Christopher Miller, Fairfax, VA (US); Marcin Piotr Kowalski, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 49 days.

(21) Appl. No.: 14/860,484

(22) Filed: Sep. 21, 2015

(51) Int. Cl.
  *H04L 12/701* (2013.01)
  *H04L 29/06* (2006.01)
  *H04L 12/747* (2013.01)

(52) U.S. Cl.
  CPC .......... *H04L 63/10* (2013.01); *H04L 63/0209* (2013.01)

(58) Field of Classification Search
  None
  See application file for complete search history.

(56) References Cited

U.S. PATENT DOCUMENTS

| | | | |
|---|---|---|---|
| 8,396,946 B1 | 3/2013 | Brandwine et al. | |
| 8,745,755 B2 | 6/2014 | Borzycki et al. | |
| 9,042,384 B2 | 5/2015 | Sridharan et al. | |
| 9,203,748 B2 | 12/2015 | Jiang et al. | |
| 2006/0133413 A1* | 6/2006 | Bousis | H04L 29/12358 370/466 |
| 2008/0201486 A1* | 8/2008 | Hsu | H04L 29/06 709/238 |
| 2009/0147795 A1* | 6/2009 | Mevissen | H04L 29/06 370/401 |
| 2012/0124129 A1 | 5/2012 | Klimentiev et al. | |
| 2012/0179802 A1 | 7/2012 | Narasimhan et al. | |
| 2013/0258963 A1* | 10/2013 | Mihaly | H04L 12/4633 370/329 |
| 2013/0291087 A1 | 10/2013 | Kailash et al. | |
| 2013/0315243 A1* | 11/2013 | Huang | H04L 45/741 370/392 |

(Continued)

OTHER PUBLICATIONS

KR20040001211. English Translation. 2004.*

(Continued)

*Primary Examiner* — Venkat Perungavoor
(74) *Attorney, Agent, or Firm* — Robert C. Kowert; Meyertons, Hood, Kivlin, Kowert & Goetzel, P.C.

(57) ABSTRACT

Methods and apparatus that extend private network functionality to client devices that are not part of a provider network. A net device may provide private network control plane functionality to devices that are external to the provider network and connected to ports on the net device. The devices are assigned addresses within the address space of the private network. Packets sent from the devices through the net device are encapsulated by the net device and routed over the private network to their destinations. Packets sent to the devices are routed by the private network to the net device, decapsulated, and provided to the devices. Via the functionality provided by the net device, a client may configure and manage client devices as part of their client private network using the same services and APIs that are used to configure and manage their virtual resources on the client private network.

20 Claims, 13 Drawing Sheets

(56) References Cited

U.S. PATENT DOCUMENTS

2015/0304427 A1* 10/2015 Ortacdag .............. H04L 61/256
713/160
2015/0381773 A1* 12/2015 Visser ..................... H04L 69/22
370/392

OTHER PUBLICATIONS

Amazon AWS document. Feb 2013. http://docs.aws.amazon.com/AmazonVPC/latest/NetworkAdminGuide/Cisco_ASA(Wayback Machine).*

Your Customer Gateway. Feb 14, 2013.*

* cited by examiner

INTEGRATING EXTERNAL DEVICES WITH PRIVATE NETWORKS IN PROVIDER NETWORK ENVIRONMENTS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers or clients. Some public data center operators provide network access, power, and secure installation facilities for hardware owned by various clients, while other public data center operators provide "full service" facilities that also include hardware resources made available for use by their clients. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many clients with diverse needs, allowing various computing resources to be efficiently and securely shared by multiple clients. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

Figure 1:
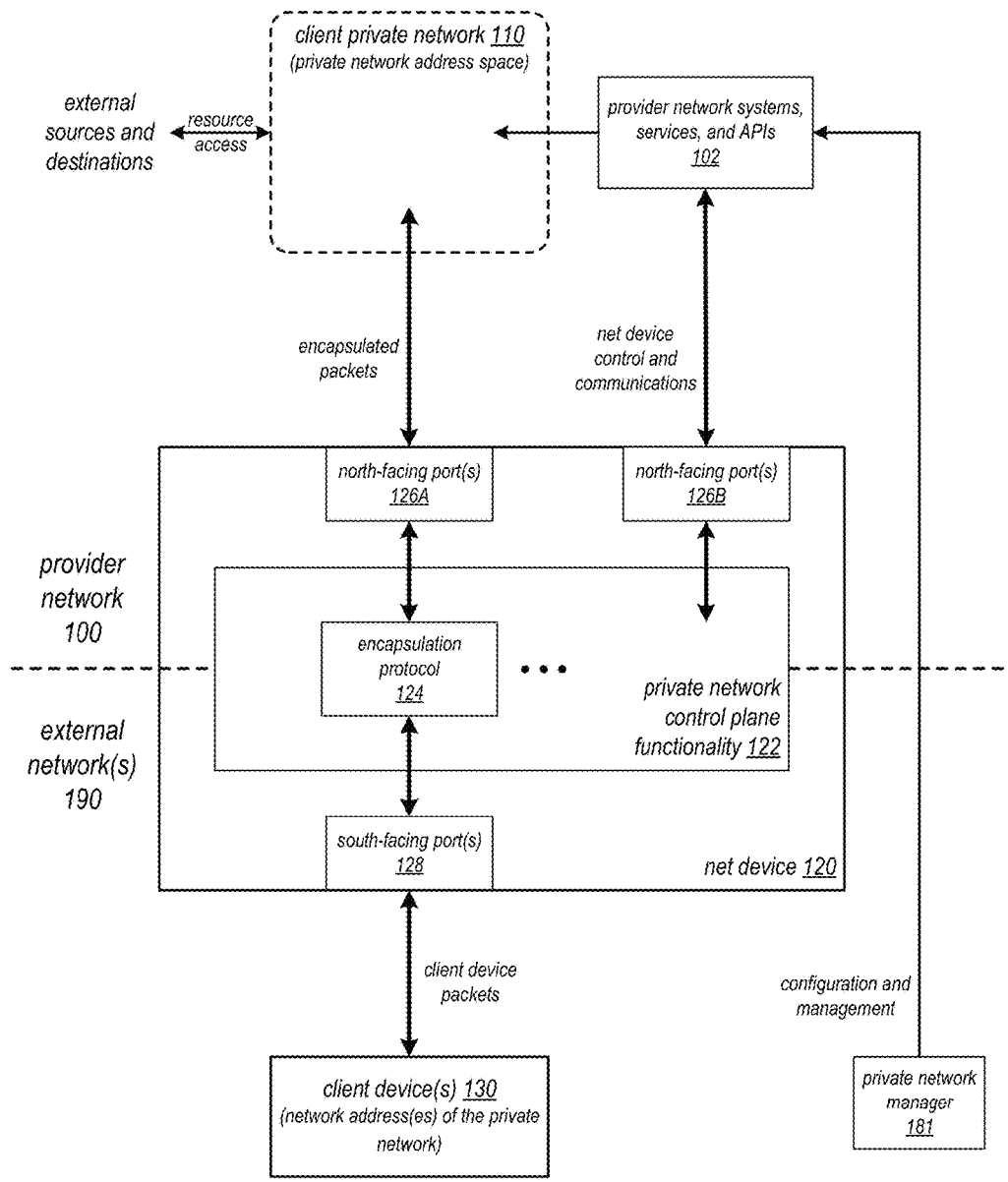
FIG. 1 illustrates an example net device that provides private network functionality to client devices that are not part of the provider network to integrate the client devices with a client private network on the provider network, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for integrating client devices with client private networks in provider network environments are described. A provider network may provide services and application programming interfaces (APIs) that allow clients to establish and manage client private networks on the provider network. A private network in a provider network environment may be broadly defined as a network space (e.g., logically defined by an address range or address space) that contains a set of provider network resources of a respective client, and that acts as a logically isolated section on the provider network for the client's resources. A private network may implement a private or local Internet Protocol (IP) address space according to a network protocol, for example 32-bit IP addresses within an Internet Protocol version 4 (IPv4) address range or subnet. Sources (e.g., endpoints such as computation resources, storage resources, servers, host systems, etc.) on a private network may be assigned IP addresses (e.g., 32-bit IPv4 addresses) within the private network's address space.

Conventionally, the client private networks include the clients' provider network resource instances, such as virtual machines (VMs) on host systems configured as virtual computing resources by the client. Embodiments of methods and apparatus are described that extend private network functionality to client devices that are not part of the provider network. In some embodiments, a network device (also referred to herein as a net device) may be configured to provide private network control plane functionality to one or more client devices connected to ports on the net device. Via the private network control plane functionality provided by the net device, a client may configure and manage their own client device as part of their client private network using the same services and APIs that are used to configure and manage their virtual resources on the client private network. The client device may be assigned an address within the private network's address space. Packets sent from the client device to endpoints on the client private network or external to the client private network via the net device are encapsulated by the net device according to the client private network's address space using the private network control plane functionality and routed by the client private network control plane to their destinations. Packets sent to the client device from endpoints on the client private network or external to the client private network are encapsulated according to the client private network's address space, routed by the client private network control plane to the net device, decapsulated by the net device, and provided to the client device.

Embodiments of the methods and apparatus for integrating client devices with client private networks in provider network environments may allow clients to include hardware devices, for example proprietary or custom hardware devices, as resources in their client private networks in the provider network environment. Thus, using embodiments, hardware technology needed by a client that may not be supported or provided by the service provider's provider network technology may be added to the client's private network implementation by connecting the hardware to the client private network via the net device. Embodiments may also provide a unified interface (e.g., services and APIs) for configuring and managing virtualized resources in the client's private network and the client's external hardware integrated with the client private networks via the net device. Embodiments may also extend functionality provided via the private network control plane, for example security groups, to the client's hardware devices connected to the client's private network via the net device.

Figure 2:
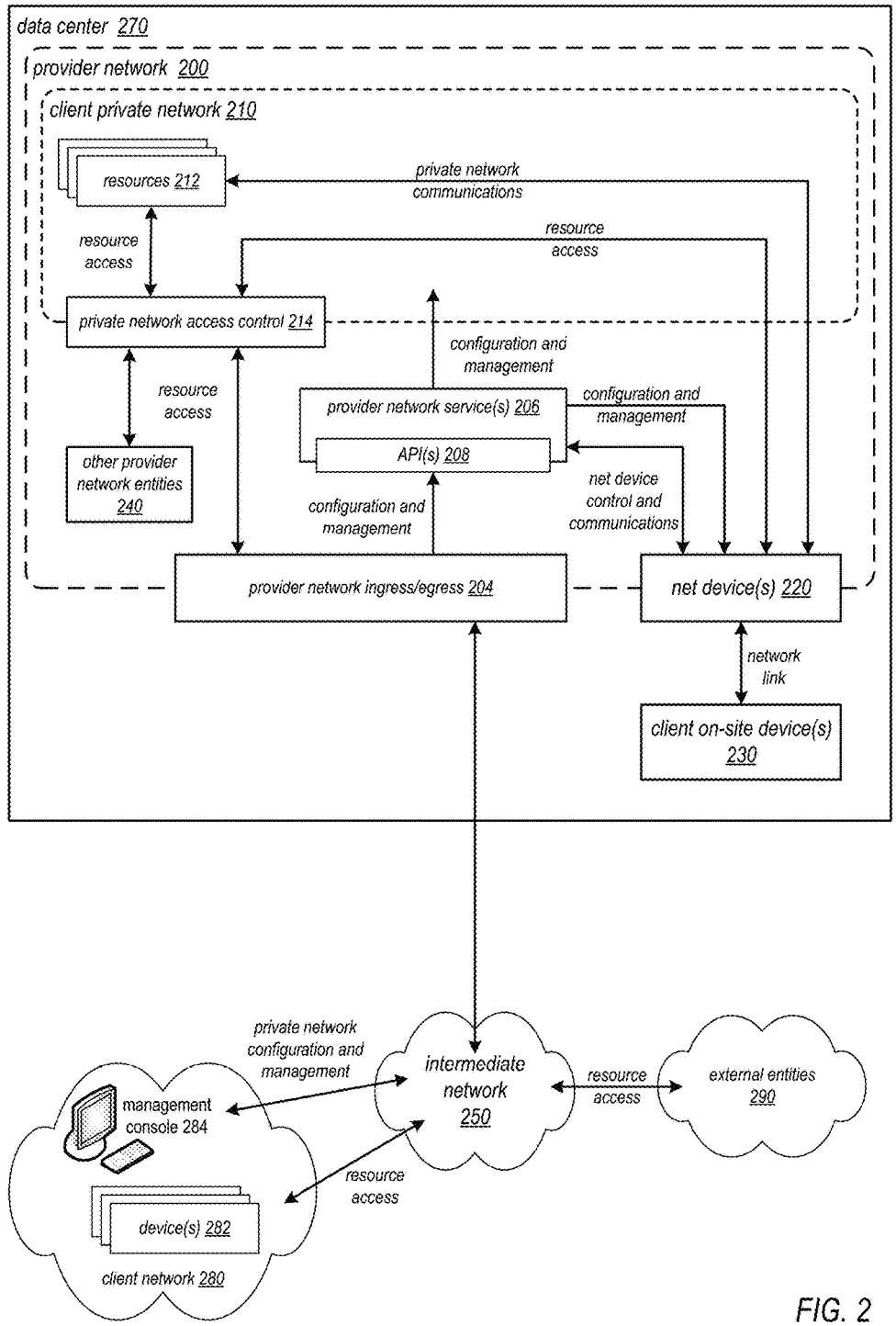
FIG. 2 illustrates an example provider network environment in which a client on-site device is integrated with a client private network on the provider network via a net device, according to some embodiments.
Figure 3:
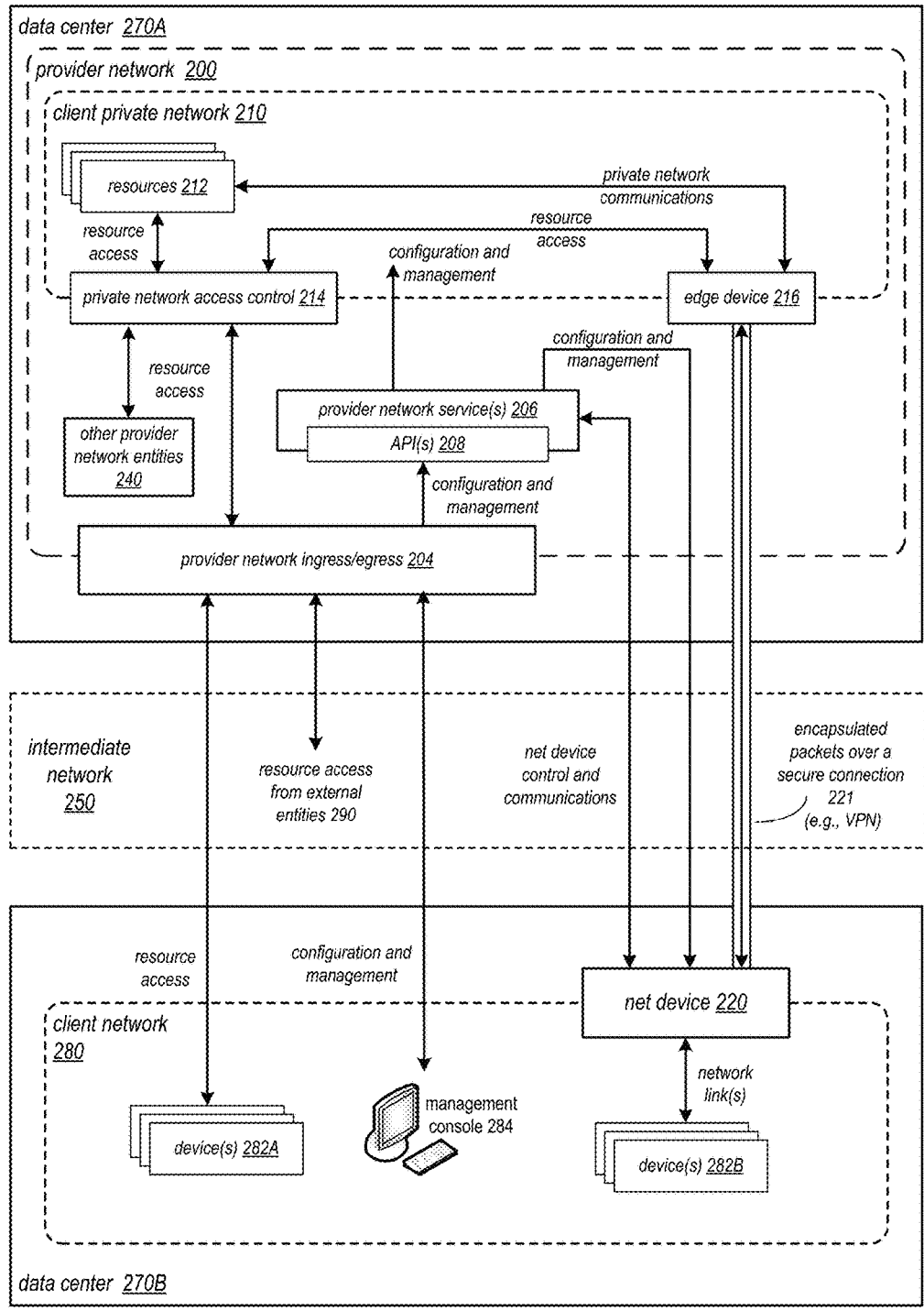
FIG. 3 illustrates an example provider network environment in which client devices at a client site may be integrated with a client private network on the provider network via a net device at the client site, according to some embodiments.
Figure 4:
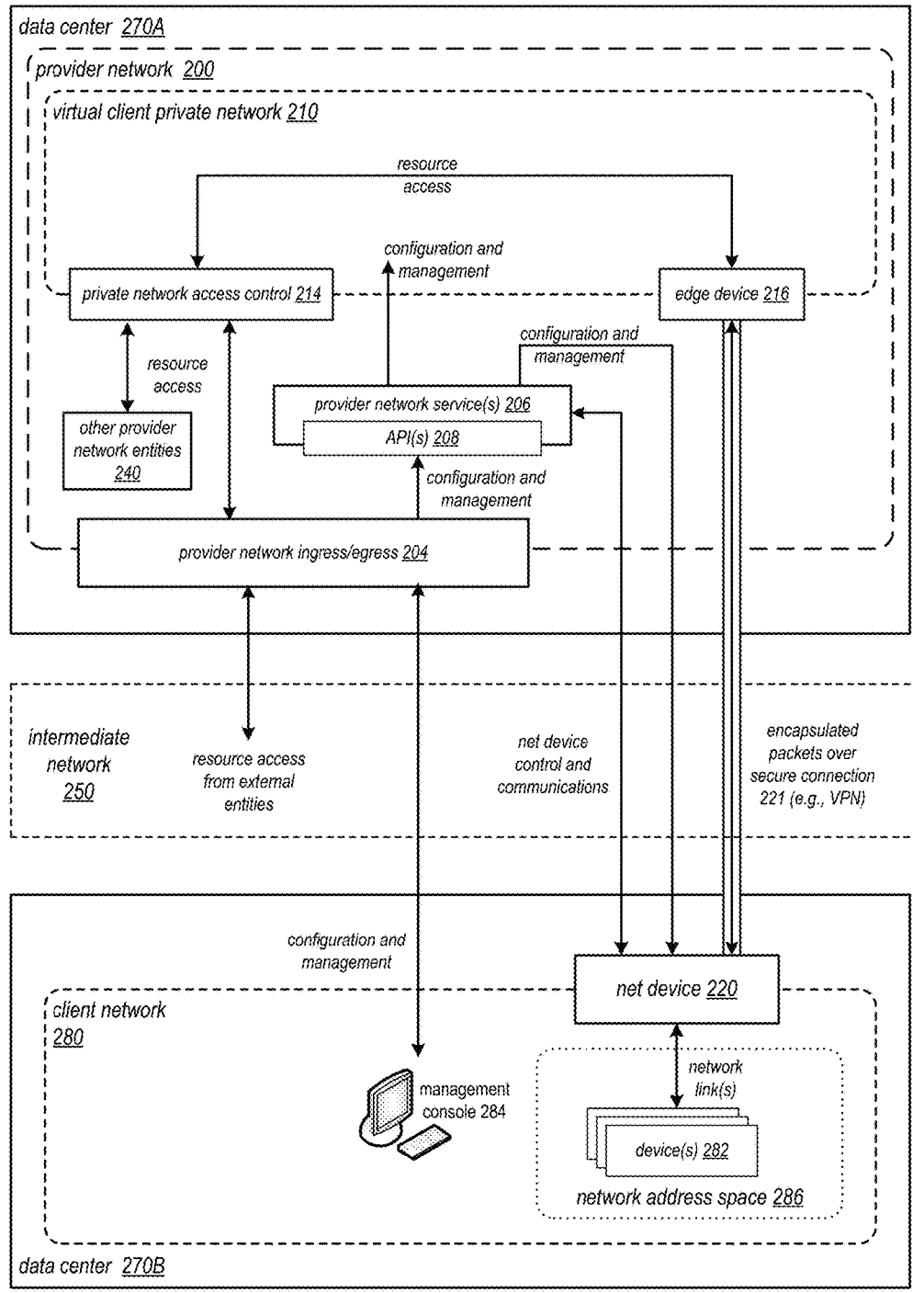
FIG. 4 illustrates an example provider network environment in which client devices in a client's data center are configured as a virtual client private network on a provider network via a net device at the client site, according to some embodiments.
Figure 5:
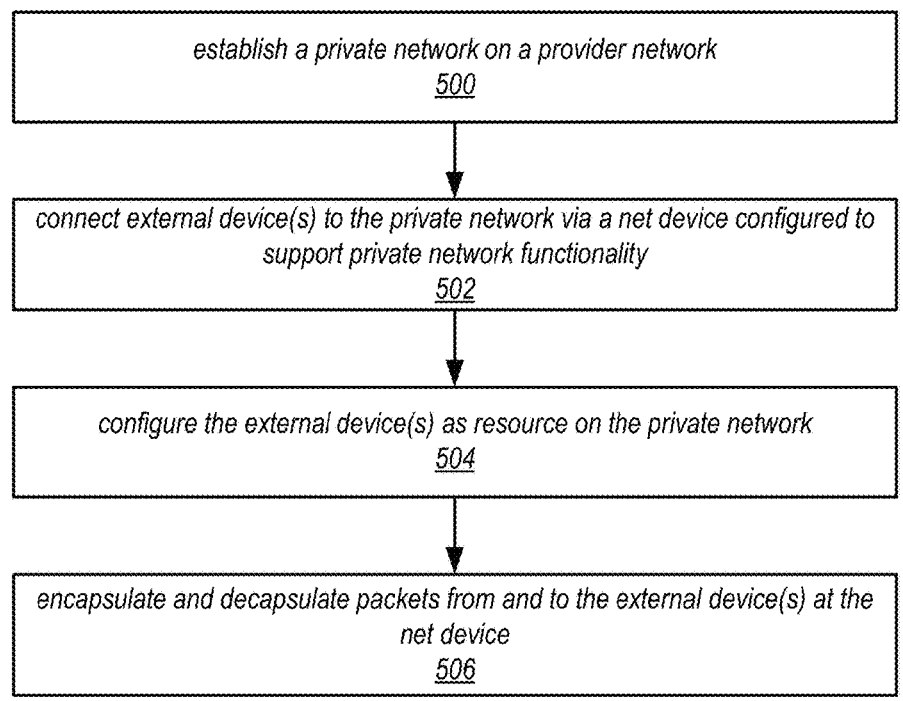
FIG. 5 illustrates an example method for providing private network functionality to client devices that are not part of the provider network to integrate the client devices with a client private network on the provider network, according to some embodiments.

FIG. 5 illustrates an example method for providing private network functionality to client devices that are not part of the provider network to integrate the client devices with a client private network on the provider network, according to some embodiments. As indicated at 500, a client may establish and provision a private network on a provider network, for example via APIs to one or more provider network services as illustrated in FIG. 2 or 3. Alternatively, the private network may be dynamically established by a net device, for example as illustrated in FIG. 4. As indicated at 502, the client may connect one or more external devices to the private network via a net device configured to support private network functionality, for example as illustrated in FIG. 1. The net device may be installed in the service provider's facility or data center as illustrated in FIG. 2, or alternatively may be located in the client's facility or data center as illustrated in FIG. 3 or 4. The external device(s) may be installed in the service provider's facility or data center as illustrated in FIG. 2, or alternatively may be located in the client's facility or data center as illustrated in FIG. 3 or 4. The external device(s) may then be configured as resource(s) on the private network, for example via APIs to provider network services as illustrated in FIG. 2 or 3, or dynamically by the net device as illustrated in FIG. 4. As indicated at 506, the net device may encapsulate and decapsulate packets from and to the external device(s), for example as illustrated in FIG. 1. The elements of the method of FIG. 1 are further described in reference to FIGS. 1 through 4.

FIG. 1 illustrates an example net device 120 that provides private network functionality to client devices 130 that are not part of the provider network 100 to integrate the client devices 130 with client private networks 110 on the provider network 100, according to some embodiments. In some embodiments, a net device 120 may be implemented as a stand-alone networking device, for example a network switch device. The net device 120 may be physically located in the provider network 100 data center and attached to the provider network 100, or alternatively may be physically located in a client's data center and attached to the client's local network. In some embodiments, net devices 120 may be implemented as two or more devices (e.g., (e.g., Peripheral Component Interconnect (PCI) devices) installed in another device or system. In some embodiments, net devices 120 may be implemented as rack-mounted devices (e.g., Peripheral Component Interconnect (PCI) devices) in the provider network 100 environment. Note that a net device 120 may be implemented in various other ways using various technologies. A net device 120 may include one or more south-facing (i.e., towards external devices or networks) ports 128 and one or more north-facing (i.e., towards the provider network) ports 126.

Figure 13:
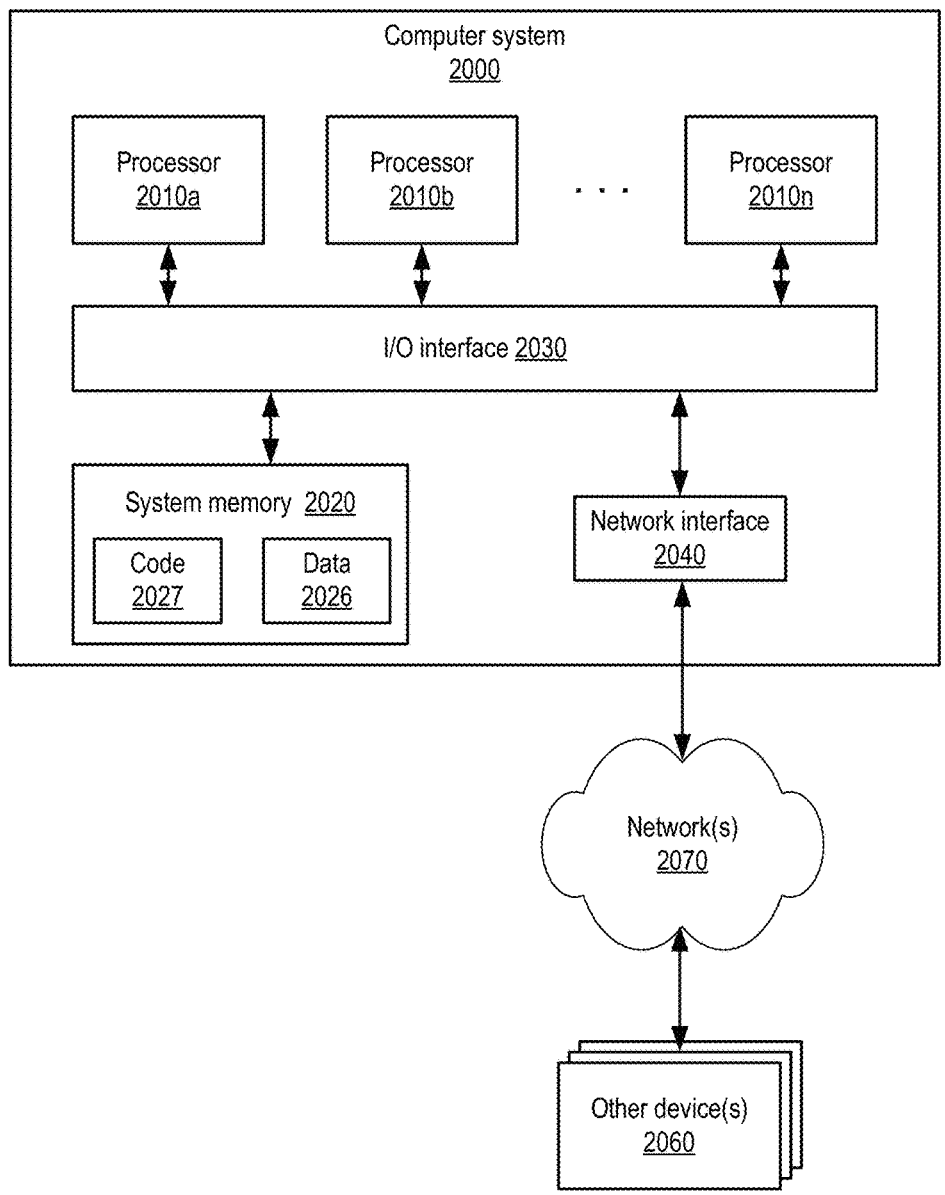
FIG. 13 is a block diagram illustrating an example computer system that may be used in some embodiments.

A net device 120 may implement private network control plane functionality 122 in hardware, software, or a combination thereof. For example a net device may be implemented according to, or may include one or more components or modules implemented according to, a system architecture as illustrated in FIG. 13. Private network control plane functionality 122 may, for example, include an implementation of encapsulation protocol 124 technology to encapsulate and route network packets (e.g., IP packets received from client device(s) 130) over a network substrate within the provider network 100, and to decapsulate network packets targeted at the client device(s) 130 and forward the decapsulated network packets to target client device(s) 130. Private network control plane functionality 122 may include implementations of other private network functions, including but not limited to support for security group or other access control functionality of private networks as described herein.

As shown in FIG. 1, a net device 120 may be physically connected (either via a direct connection or over an intermediate network 190) to one or more client devices 130 via one or more south-facing ports 128. The net device 120 may also be connected to the provider network 100 (either via a direct connection or over an intermediate network 190) via one or more north-facing ports 128. The net device 120 may encapsulate and route network packets received from client device(s) 130 via port(s) 128 onto the client private network 110 via port(s) 126A, and may decapsulate network packets received via the client private network 110 via port(s) 126A and provide the network packets to respective client device(s) 130 via port(s) 128.

The client device(s) 130 may include any type of hardware computing devices or systems that include network interface functionality. The client device(s) 130 may include commodity devices or systems and/or proprietary or custom devices or systems. Examples of client devices 130 may include, but are not limited to, printers, storage devices or systems (e.g., network-attached storage (NAS) systems), proprietary or custom server, host, database, or computation devices or systems, or in general any hardware device or system that can couple to a network or network device and communicate via a network interface. Client device(s) 130 may also include host systems that implement one or more virtual machines (VMs) according to a virtualization technology. Client device(s) 130 may implement any of a variety of operating systems, software (e.g., application or server software), or network protocols (e.g., TCP/IP, HTTP, HTTPS, UDP, POP, SMTP, HTTP, FTP, HTTPS, etc.), or combinations thereof. While not shown, a client device 130 may include or be coupled to one or more peripheral devices, or may connect to other devices on a local network.

In some embodiments, private network control plane functionality 122 of the net device 120 may communicate with one or more provider network systems or services 102, for example via one or more north-facing ports 126B, to provide information (e.g., routing or network address information) about the net device 120 and/or its attached device(s) 130, or to receive information (e.g., routing or network address information) from other provider network systems or services the provider network 100. For example, private network control plane functionality 122 may send network address and/or route information to or receive network address and/or route information from one or more provider network systems or services as illustrated in FIGS. 8 through 12, for example to a mapping service 1030 as illustrated in FIG. 9, or to networking devices (e.g., routers, switches, load balancers, etc.) on the provider network 100 substrate.

Figure 12:
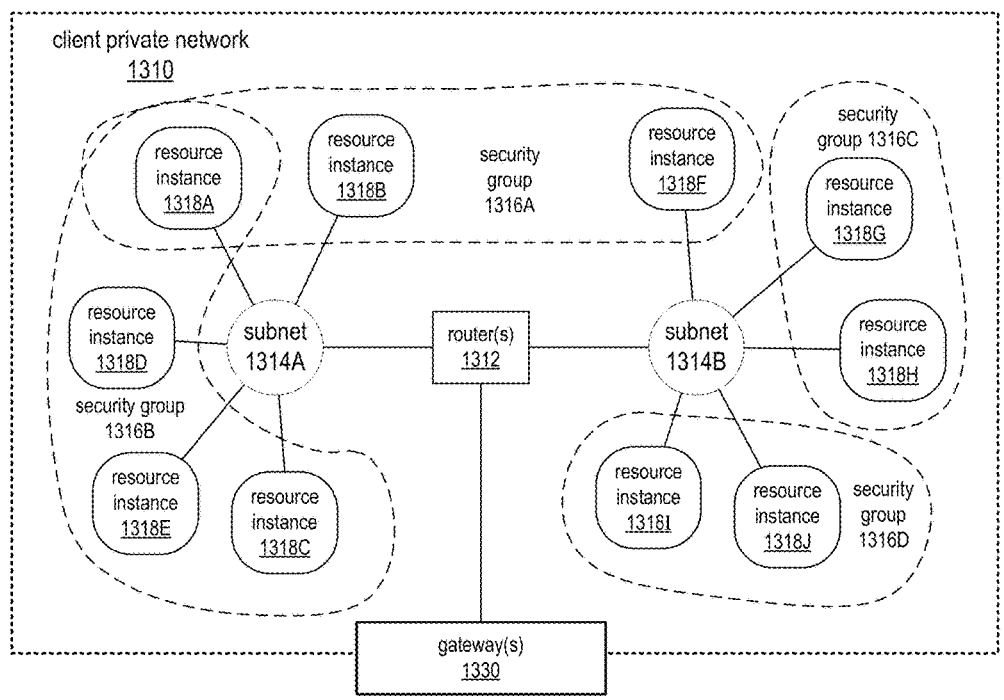
FIG. 12 illustrates subnets and security groups in an example virtual private network implementation on a provider network, according to at least some embodiments.

In some embodiments, a service provider may provide one or more private network services and one or more application programming interfaces (API(s)) to the services that allow clients (e.g., a private network manager 181 using a management console) to provision, configure, manage, and view client private networks 110, including the client devices 130 integrated with the private networks 110 via the net device(s) 120 as described herein. For example, in some embodiments, a private network manager 181 may establish and manage private network 110 access control, including but not limited access control rules and security groups as shown in FIG. 12, via the private network services. The APIs and services may allow the manager 181 to establish access control rules for the connected device(s) 130, include the device(s) in security groups, and otherwise configure, view, and manage the device(s) 130 in the same manner and using the same or similar interface as the client's virtual resource instances in the private network 110.

Embodiments of the methods and apparatus for integrating client devices with client private networks in provider network environments may, for example, be implemented in the context of a service provider that provides to clients or customers, via an intermediate network such as the Internet, virtualized resources (e.g., virtualized computing and storage resources) implemented on a provider network of a service provider, typically in a data center of the service provider. FIGS. 2 through 4 illustrate example provider network environments in which embodiments of the methods and apparatus for integrating client devices with client private networks may be implemented. FIGS. 8 through 12 and the section titled Example provider network environments further illustrate and describe example service provider network environments in which embodiments of the methods and apparatus as described herein may be implemented.

FIG. 2 illustrates an example provider network environment in which a client on-site device is integrated with a client private network on the provider network via a net device, according to some embodiments. FIG. 2 shows as an example a provider network 200 implemented in a data center 270. Referring to FIG. 2, in at least some embodiments of a provider network 200, at least some of the resources provided to clients of a service provider via the provider network 200 may be virtualized computing resources implemented on multi-tenant hardware that is shared with other client(s) and/or on hardware dedicated to the particular client. Each virtualized computing resource may be referred to as a resource instance. Resource instances may, for example, be rented or leased to clients of the service provider. For example, clients of the service provider (represented in FIG. 2 by client network 280), via external client device(s) coupled to the provider network 200 via an intermediate network 250 such as the Internet, may access one or more services 206 of the provider network via application programming interfaces (API(s)) 208 to the services 206 to obtain and configure resource instances, including but not limited to computation resources and storage resources.

At least some of the resource instances on the provider network 200 may be implemented according to hardware virtualization technology that enables multiple operating systems to run concurrently on a host computer, i.e. as virtual machines (VMs) on the host. A hypervisor, or virtual machine monitor (VMM), on a host presents the VMs on the host with a virtual platform and monitors the execution of the VMs. Each VM may be provided with one or more IP addresses; the VMM on a respective host may be aware of the IP addresses of the VMs on the host. For further information about hardware virtualization technology on a provider network, see FIG. 9.

Referring to FIG. 2, the provider network 200 may include a network substrate that includes networking devices such as routers, switches, network address translators (NATs), and so on, as well as the physical connections among the devices. In at least some embodiments, the VMMs or other devices or processes on the network substrate may use encapsulation protocol technology to encapsulate and route network packets (e.g., client IP packets) over the network substrate between resource instances on different hosts within the provider network 200. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. In at least some embodiments, the encapsulation protocol technology may include a mapping service that maintains a mapping directory that maps IP overlay addresses (public IP addresses) to substrate IP addresses (private IP addresses) and that may be accessed by various processes on the provider network 200 for routing packets between endpoints on the network substrate. For further information about a virtual network technology that uses an encapsulation protocol to implement an overlay network on a network substrate, see FIGS. 8 through 12.

Figure 11:
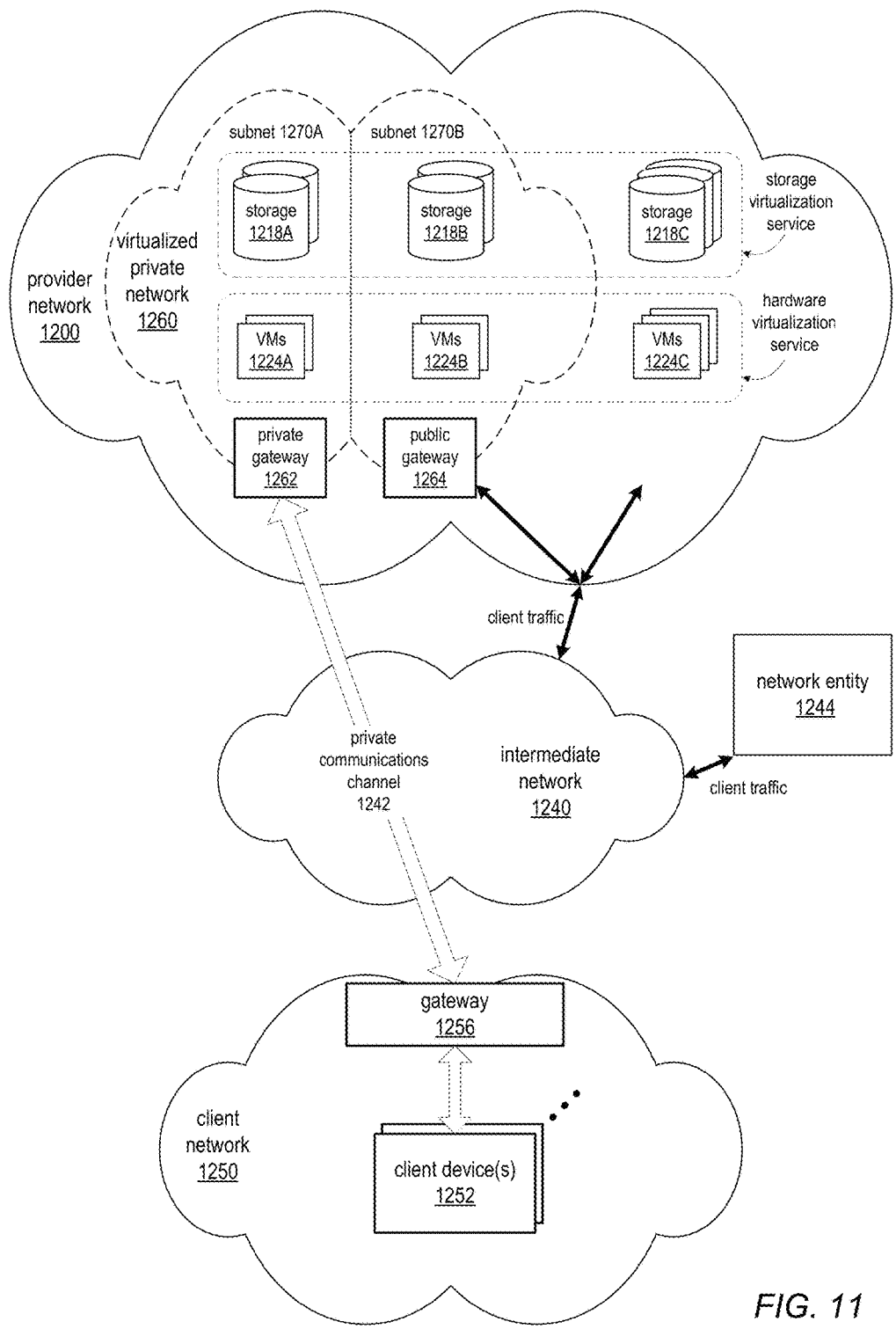
FIG. 11 illustrates an example provider network that provides virtualized private networks to at least some clients, according to at least some embodiments.

Referring to FIG. 2, a service provider may provide one or more provider network services 206 and one or more APIs 208 to the services 106 that allow clients to provision logically isolated sections of the provider network 200 in which the clients can launch their respective resource instances in a client-defined virtual network on the provider network 200, referred to herein as a virtualized private network or client private network, or as simply a private network. Via the APIs 208, a client (represented in FIG. 2 by client network 280) may establish, configure, and manage a client private network 210 on provider network. The client may also establish and manage client private network access control 214 for the virtual networking environment of the client private network 210 via the API(s) to private network service(s) 206. For example, the client may perform one or more of selecting IP address ranges, creating subnets and network ACLs, creating and managing security groups, and configuring route tables, network gateways, load balancers, routers, and other network functionalities to configure the client private network 210 and to control access to the client private network 210 and its resources 212. Via the API(s) 208, a client may customize the network configuration of their client private network 210. For example, as illustrated in FIG. 11, a client can create a public-facing subnet for web server resources that has access to the Internet, and may place backend system resources such as databases or application servers in a private-facing subnet with no Internet access. A client may leverage multiple layers of security, including but not limited to security groups and network ACLs, to control access to subnets and/or to resource instances in each subnet, for example as illustrated in FIG. 12.

In some embodiments, a given client may establish one, two, or more separate private networks 210 on a provider network 200, and different clients may each establish private networks 210 on a provider network 200. In some embodiments, a client may specify an IP address space for each client private network 210 on the provider network 200. In some embodiments, the IP address spaces of two (or more) client private networks 210 may, but do not necessarily, overlap.

In FIG. 2, a client corresponding to client network 280 has established and provisioned a client private network 210 on provider network 200. In FIG. 2, private network 210 has been provisioned with provider network resources 212 (e.g., virtual machines (VMs) on host systems configured as virtual computing resources by the client associated with client network 280). A private network 210 may include or implement access control and security rules and methods to control access to the private network 210 and to the resources on the private network 210 by entities external to the private network 210. For example, in FIG. 2, private network 210 includes an access control 214 component or layer that controls access to resources 212 from client network 280, other external entities 290, and other provider network entities 240. While FIG. 2 shows only a single client private network 210 in provider network 200, a provider network 200 may include two or more client private networks 210.

Embodiments of the methods and apparatus for integrating client devices with client private networks in provider network environments as described herein may, for example, allow a client entity (e.g., a corporation, company, university, etc. associated with client network 280) that needs access to custom or proprietary hardware devices 230 via their private network 210 implementations that are not provided as resources on the provider network 200 to install those physical device(s) 230 in the service provider's data center 270 and to connect the device(s) 230 to their private network 210 implementation via connections (e.g., fiber optic or other direct cable connections, referred to as network links) to ports on the net device(s) 220 in the data center 270 as described herein. The device(s) 230 may be integrated into the client private network 210 via the net device(s) 220 and may be managed in a similar manner as the client's other private network 210 resources 212 via private network control plane functionality of the net device(s) 220. The client may configure, manage, and view the integrated device(s) 282, for example from a management console 284, via the same APIs 206 and services 208 that are used to manage the other resources 212 in the client private network 210. For example, the client may assign addresses or address ranges within the private network's address space to the device(s) 230, may establish access control 214 rules for the device(s) 230, and may establish relationships between the devices 230 and other resources 212 on the client private network 210.

Private network control plane functionality implemented by the net device(s) 220 may, for example, include an implementation of encapsulation protocol 224 technology configured to encapsulate and route network packets (e.g., IP packets received at south-facing ports from client device(s) 230 via the network links) over a network substrate within the provider network 200, and to decapsulate network packets received via the north-facing ports connected to the private network 210 that are targeted at the client device(s) 230 and provide the decapsulated network packets to the target client device(s) 230 via the south-facing ports.

The private network access control 214 and other functionality of the client private network 210 may be applied to the connected device(s) 230 in the same or similar manner as they are applied to the client's other resources 212 on the private network 210. For example, in some embodiments, one or more security- and access-related items, which may include but are not limited to security groups, security rules, routing tables, and network access control lists (ACLs) used to control access into subnets, may exist in the client private network 210, and may be applied to the device(s) 230 connected to the private network 210 via the net device(s) 220 as well as to the other resources 212 in the private network 210.

In at least some embodiments, the service provider that provides the provider network 200 may charge clients for resource usage (e.g., computation and storage resource usage), bandwidth usage, and other types of network usage. The service provider may also charge clients for on-site installation of the client device(s) 230, and may also charge the clients for power usage, bandwidth usage, and/or other types of network usage associated with the client device(s) 230.

While FIG. 2 shows an example where a client device 220 is installed in the service provider's data center 270 and connected to a client private network 210 via a net device 220 in the data center, in some embodiments, a net device 220 may be installed in a client's data center and used to connect and integrate device(s) in the client's data center with the client's private network implementation in the service provider's data center. FIG. 3 illustrates an example provider network environment in which one or more client devices 282B in the client's data center 270 are integrated with a client private network 210 on a provider network 200 in a service provider's data center 270A via a net device 220 installed at the client site, according to some embodiments.

In FIG. 3, a client corresponding to client network 280 has established and provisioned a client private network 210 on provider network 200, for example as described in reference to FIG. 2. Private network 210 has been provisioned with provider network resources 212 (e.g., virtual machines (VMs) on host systems configured as virtual computing resources by the client associated with client network 280). The private network 210 includes an access control 214 component or layer that controls access to resources 212 from client network 280, other external entities 290, and other provider network entities 240. Client network 280 may include various client hardware devices, shown as devices 282A and 282B.

Embodiments of the methods and apparatus for integrating client devices with client private networks in provider network environments as described herein may, for example, allow a client that wants to integrate one or more hardware devices 282B installed in their data center 270 with their private network 210 implementation on the provider network 200 to install one or more net devices 220 in their data center 270B and to connect the device(s) 282B to ports on the net device(s) 220, for example using fiber optic or other cable connections. The device(s) 282B may be integrated into the client private network 210 via the net device(s) 220 and may be managed in a similar manner as the client's other private network 210 resources 212 via private network control plane functionality of the net device(s) 220. The client may configure, manage, and view the integrated device(s) 282B, for example from a management console 284, using the same APIs 206 and services 208 that are used to manage the other resources 212 in the client private network 210. For example, the client may assign addresses or address ranges within the private network's address space to the device(s) 282B, may establish access control 214 rules for the device(s) 282B, and may establish relationships between the devices 282B and other resources 212 on the client private network 210.

Private network control plane functionality of the net device(s) 220 may, for example, include an implementation of encapsulation protocol 224 technology configured to encapsulate and route network packets (e.g., IP packets received at south-facing ports from client device(s) 282B via the network links) over a network substrate within the provider network 200, and to decapsulate network packets received via the north-facing ports connected to the private network 210 that are targeted at the client device(s) 282B and provide the decapsulated network packets to the target client device(s) 282B via the south-facing ports.

In some embodiments, for security, speed, bandwidth, or other reasons, the net device(s) 220 installed in the client's data center 270B may be coupled to the client private network 210 in data center 270A via secure connection(s) 221, for example Virtual Private Network (VPN) connections established over an intermediate public network 250 or a direct connection (e.g., a fiber optic cable connection) between data centers 270A and 270B. In some embodiment, a secure connection 221 may connect a north-facing port of a net device 220 to an edge device 216 of the client private network 210. Private network 210 traffic may flow between the device(s) 282B and the private network 210 infrastructure over the secure connection 221.

The private network access control 214 and other functionality of the client private network 210 may be applied to the connected device(s) 282B in the same or similar manner as they are applied to the client's other resources 212 on the private network 210. For example, in some embodiments, one or more security- and access-related items, which may include but are not limited to security groups, security rules, routing tables, and ACLs used to control access into subnets, may exist in the client private network 210, and may be applied to the device(s) 282B connected to the private network 210 via the net device(s) 220 as well as to the other resources 212 in the private network 210.

In at least some embodiments, the service provider that provides the provider network 200 may charge clients for resource usage (e.g., computation and storage resource usage), bandwidth usage, and other types of network usage. The service provider may also charge clients for client-site installation of the net device(s) 220, and may also charge the clients for bandwidth usage and/or other types of network usage associated with the client device(s) 282B connected to the private network 210 via the net device(s) 220.

While FIG. 2 shows an example where the client device is installed in the service provider's data center and connected to a client private network via the net device in the service provider's data center, and FIG. 3 shows an example where a net device is installed in a client's data center and used to connect and integrate device(s) in the client's data center with the client's private network implementation in the service provider's data center, in some embodiments, the net device may be installed in the service provider's data center, and client devices in the client's data center (or in some other external facility) may be connected to the net device, for example using secure connections such as VPNs or using fiber optic or other direct or dedicated cable connections.

In some embodiments, the net device functionality described herein may be used to dynamically generate and manage virtual client private networks that include devices physically installed at a client's data center. FIG. 4 illustrates an example provider network environment in which client devices 282 in the client's data center 270B are dynamically configured and managed as a virtual client private network 210 on a provider network 200 via a net device 220 installed at the client site (data center 270B), according to some embodiments.

In FIG. 4, a client corresponding to client network 280 has installed a net device 220 in their data center 270B, and has connected one or more devices 282 to south-facing ports on the device 220, for example as described in reference to FIG. 3. However, instead of assigning addresses or address ranges within the private network's address space to the device(s) 282 via the API(s) and service(s) 206, the client may configure the devices 282 on client network 280 in a logical network address space 286. Net device 220 may then receive communications or traffic from one or more of the device(s) 282. The net device 220 may communicate with provider network service(s) 206 (e.g., with a mapping service 1030 as illustrated in FIG. 9) to establish a virtual client private network 210 according to the packets received from the device(s) 282, including but not limited to the network address information in the packets, and to add device(s) 282 to the private network 210 as it becomes aware of the device(s) 282. Alternatively, the net device 220 may poll device(s) 282 coupled to its south-facing ports to obtain information, and use that information in creating and provisioning the virtual client private network 210 topology. The device(s) 282 in the private network may thus be dynamically added to the virtual client private network 210 by the net device 220. Once the virtual client private network 210 is established and provisioned, the device(s) 282 in the virtual client private network 210 may be managed via private network control plane functionality of the net device(s) 220. The client may configure, manage, and view the integrated device(s) 282, for example from a management console 284, via the same APIs 206 and services 208 that are used to manage virtual resource instances in client private networks 210. For example, the client may establish access control 214 rules for the device(s) 282, may create security groups and add devices 282 to or remove devices 282 from the security groups 282, and may establish relationships between the devices 282 and other resources (if present) on the client private network 210. The client may also obtain, provision, and manage virtual resource instances (e.g., virtual machines (VMs) on host systems configured as virtual computing resources by the client) on the virtual client private network 210 once established.

In some embodiments, for security, speed, bandwidth, or other reasons, the net device 220 installed in the client's data center 270B may be coupled to the client private network 210 in data center 270A via a secure connection 221, for example a Virtual Private Network (VPN) connection established over an intermediate public network 250 or a direct connection (e.g., a fiber optic cable connection) between data centers 270A and 270B. In some embodiment, the secure connection 221 may connect a north-facing port of the net device 220 to an edge device 216 of the client private network 210. Private network 210 traffic may flow between the device(s) 282 and the private network 210 infrastructure over the secure connection 221.

Figure 6:
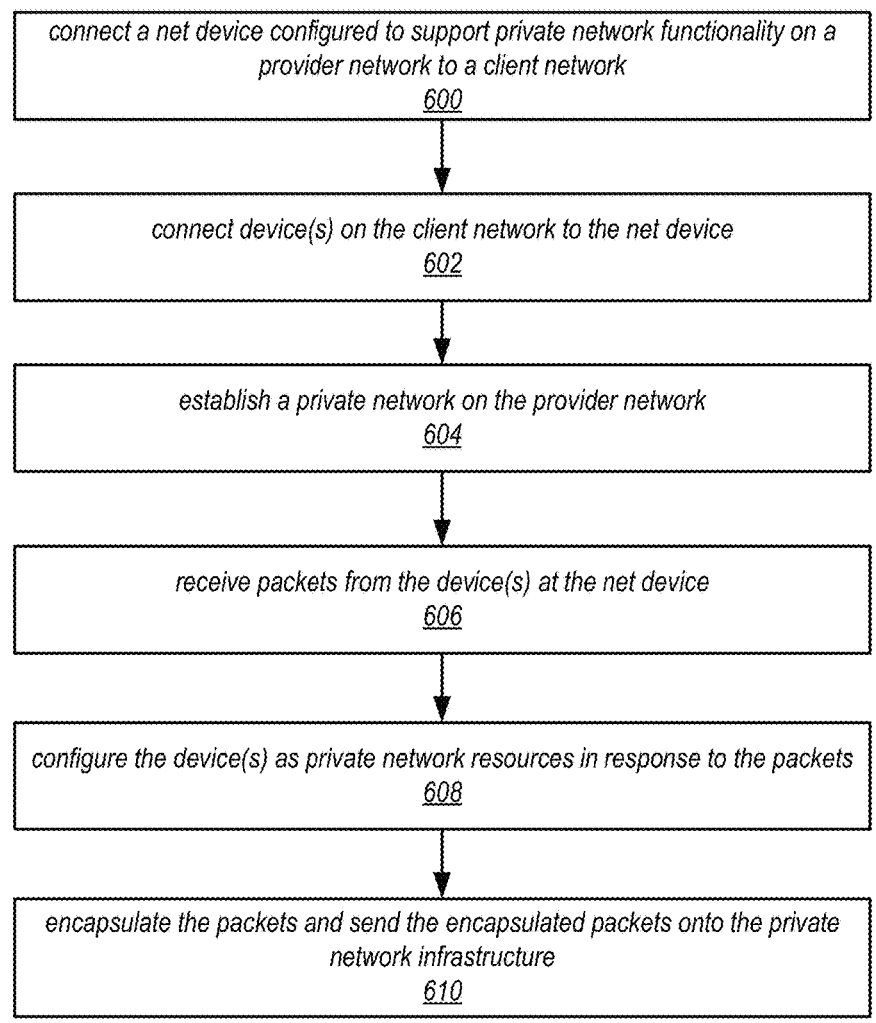
FIG. 6 illustrates an example method for configuring client off-site devices as a client private network on the provider network via a net device at the client site, according to some embodiments.

FIG. 6 illustrates an example method for configuring client off-site devices as a client private network on the provider network via a net device at the client site, according to some embodiments, for example as illustrated in FIG. 4. As indicated at 600, a client may connect a net device configured to support private network functionality on a provider network in a service provider's data center to the client's network in the client's data center. As indicated at 602, the client may connect device(s) on the client network to the net device. The connected device(s) may be assigned an address range by the client. As indicated at 604, the net device may establish a virtual private network on the provider network according to the address range of the connected devices. As indicated at 606, the net device may receive packets from the connected device(s). As indicated at 608, the net device may configure the device(s) as private network resources in the virtual client private network in response to the packets, for example by communicating with one or more provider network services. As indicated at 610, the net device may encapsulate and decapsulate packets from and to the connected device(s), for example as illustrated in FIG. 1. In some embodiments, the net device may be coupled to the client private network in the service provider's data center via a secure connection, and the encapsulated packets may flow between the client's data center and the service provider's data center over the secure connection.

Figure 7:
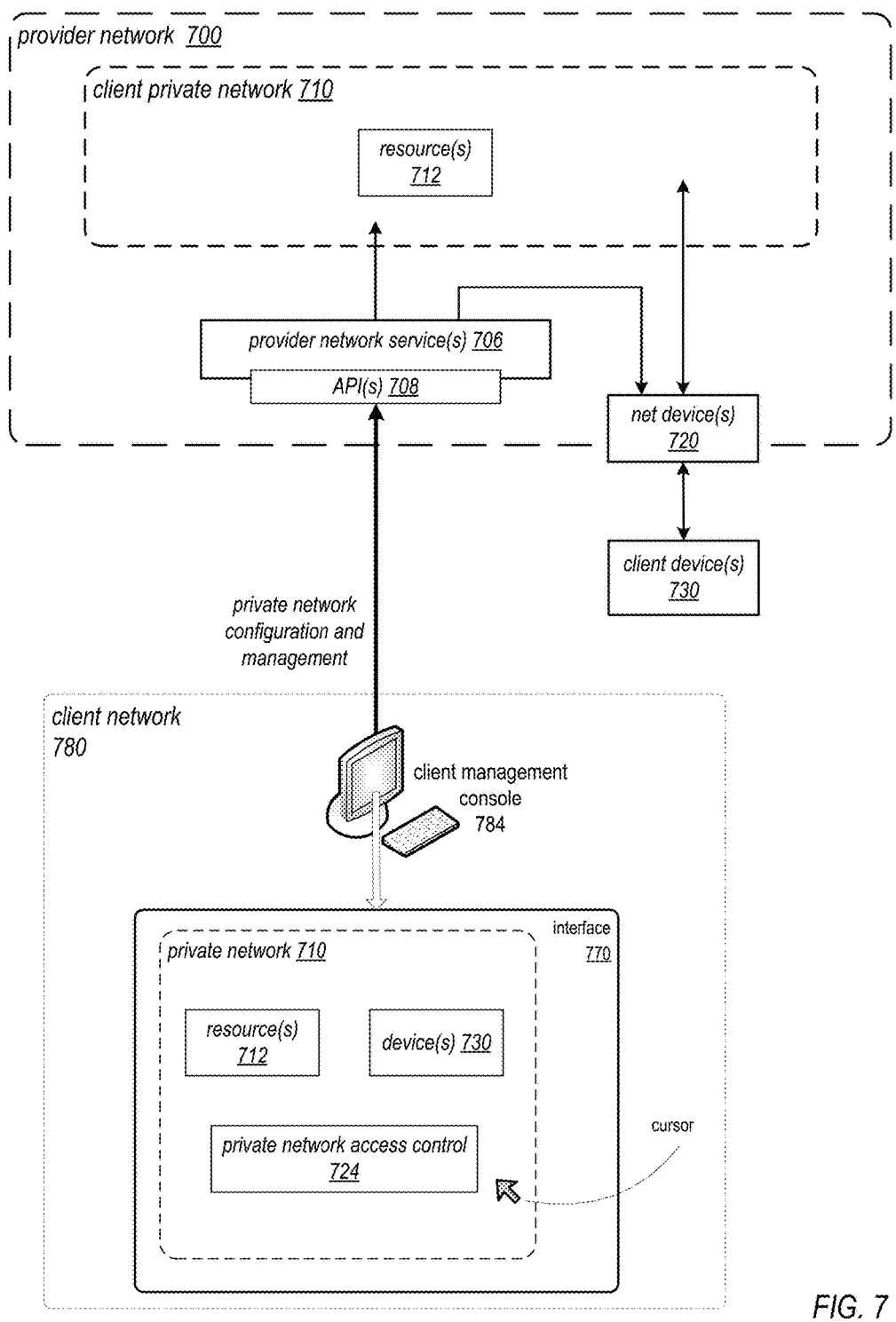
FIG. 7 illustrates provider network services and application programming interfaces (APIs) in a provider network environment, according to at least some embodiments.

FIG. 7 illustrates provider network services and APIs in a provider network environment, according to at least some embodiments. The provider network service(s) 706 and APIs 708 may, for example, be used to integrate client device(s) with client private networks in provider network environments as illustrated in FIGS. 1 through 6. A client associated with client network 710 may, for example, establish, provision, and manage a private network 710 on provider network 700 via one or more services 706 of the provider network 700 accessed through a management console 784 on client network 780. For example the client may access API(s) of one or more private network services via the management console 784 to integrate client device(s) 730 with the client private network 710 as described in reference to FIGS. 1 through 6. In at least some embodiments, the API(s) 708 may display an interface 770 on console 784 that provides one or more graphical and/or textual interface elements that allow the client to view, create, provision, and manage the client private network 710 including the attached device(s) 730.

FIG. 7 shows a non-limiting example of a graphical and/or textual interface 770 that may be displayed on a client's console 784. The interface 770 may, for example, show a graphical and/or textual representation of the topology of private network 710. Graphical and/or textual representations of one or more resources 712 and devices 730 in the private network 710 may be displayed. Graphical and/or textual representations of network elements, security and access control components or elements (e.g., security groups and subnets as illustrated in FIGS. 11 and 12), and other private network components may also be displayed. Graphical and/or textual representations of private network access control 724 for the devices 730 and other resources 712 may also be displayed.

The client may, for example, use a cursor control device to select various interface elements provided by interface 770 to, for example, create and provision client private network 710, create, manage, and modify private network access control 724 for the private network 710 and for resources 712 and devices 730 within the private network 710, and perform other private network functionality such as the creation and management of security groups. The interface 770 may include other user interface elements, for example menu or other elements that allow the client to select from among various ones of the client's private networks, elements to select, create, configure, and manage resources within private networks, elements for integrating client devices 730 with the private network 710, and so on.

In some embodiments, instead of or in addition to providing a graphical interface via console 784, a provider network 700 may provide a command line interface (CLI) to the private network services 706 via which the client may manage their private network 710. For example, in some embodiments, the client may create and provision private networks via CLI commands, create, manage, and modify access control rules for the private network 710 and for resources 712 and devices 730 within the private network 710 via CLI commands, and integrate and manage client devices 730 within the private network 710 via CLI commands.

Example Provider Network Environments

This section describes example provider network environments in which embodiments of the methods and apparatus for integrating client devices with client private networks in provider network environments as described in reference to FIGS. 1 through 7 may be implemented. However, these example provider network environments are not intended to be limiting.

Figure 8:
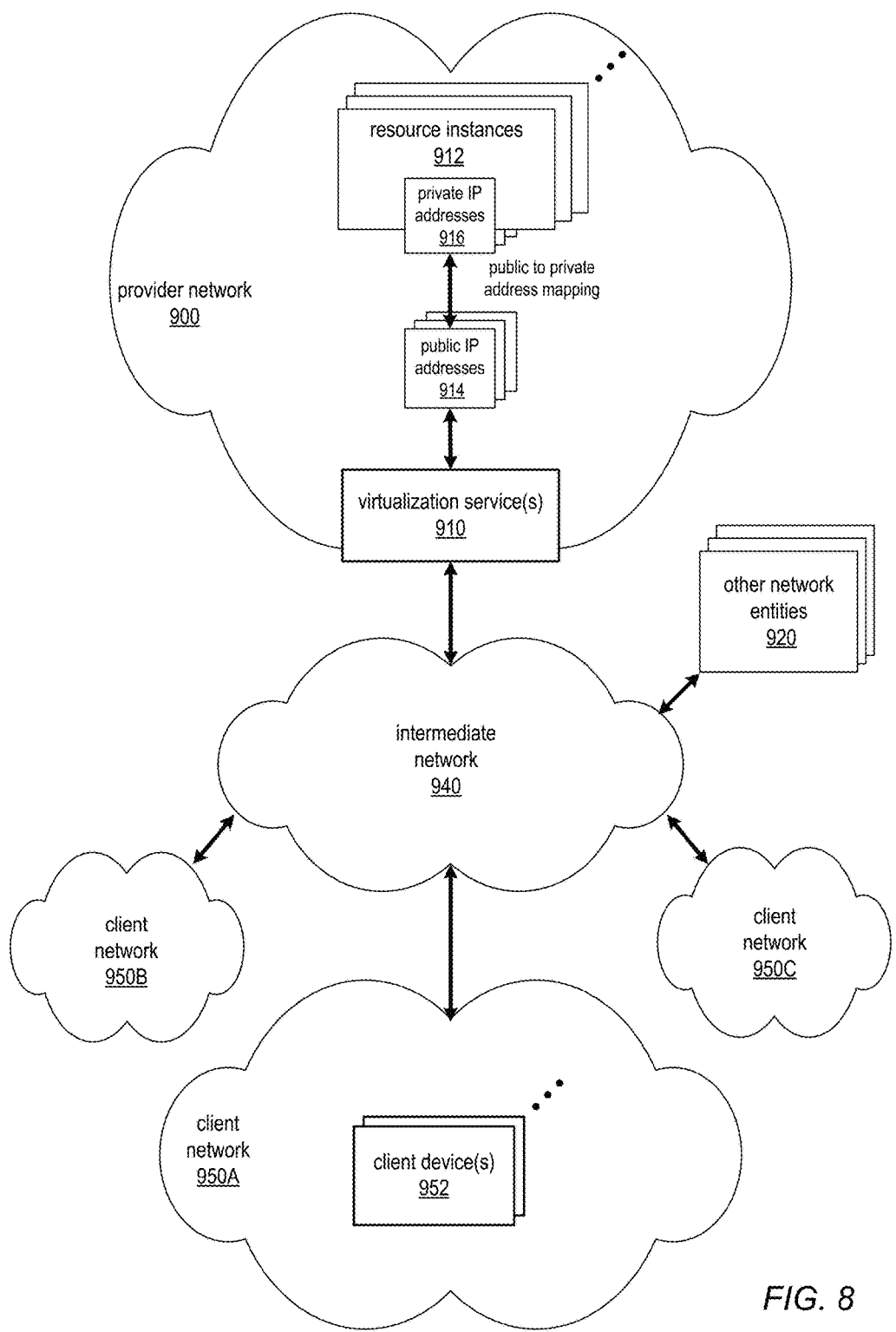
FIG. 8 illustrates an example provider network environment, according to at least some embodiments.
Figure 9:
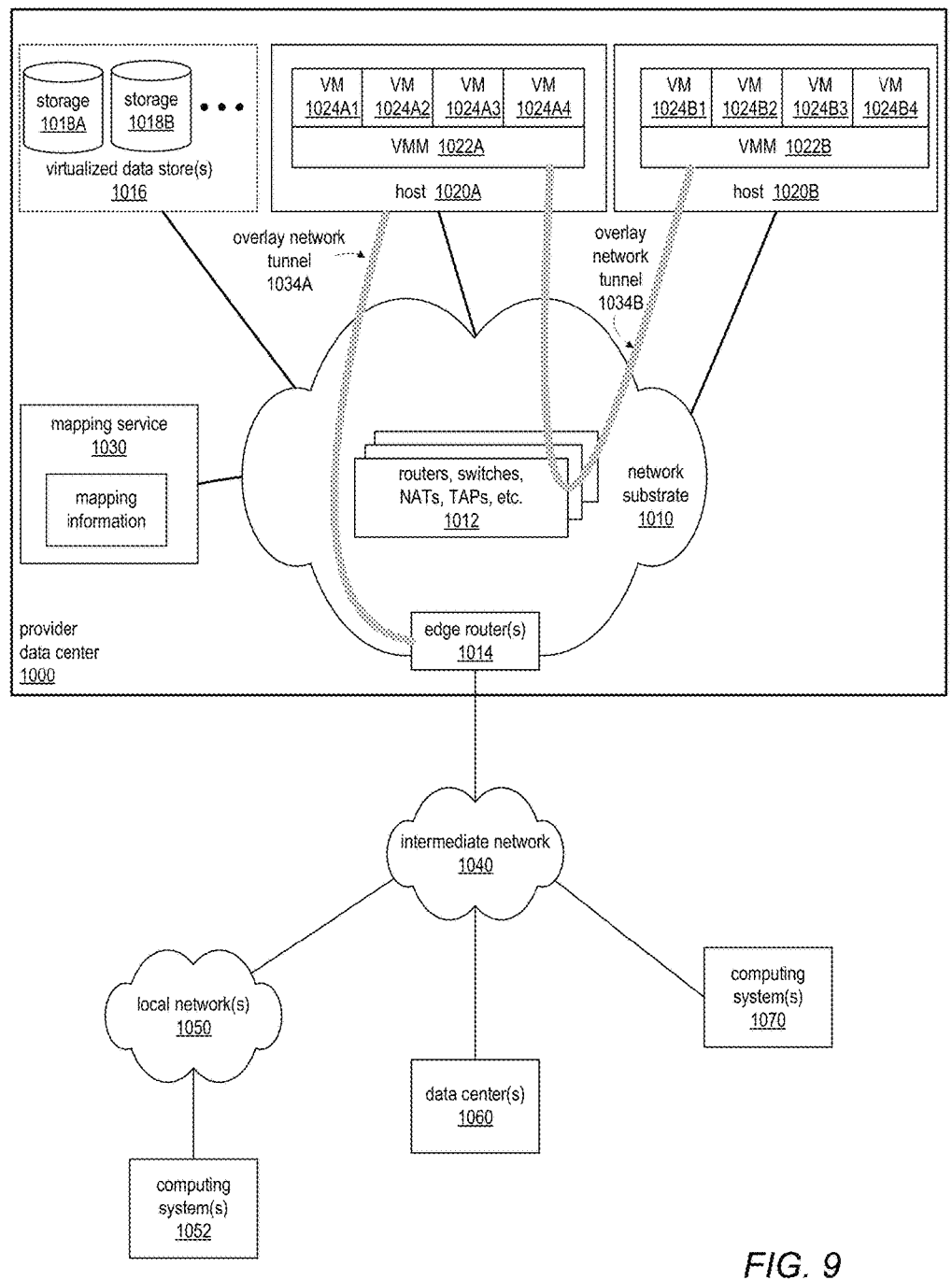
FIG. 9 illustrates an example data center that implements an overlay network on a network substrate using IP tunneling technology, according to some embodiments.

FIG. 8 illustrates an example provider network environment, according to at least some embodiments. A provider network 900 may provide resource virtualization to clients via one or more virtualization services 910 that allow clients to purchase, rent, or otherwise obtain instances 912 of virtualized resources, including but not limited to computation and storage resources, implemented on devices within the provider network or networks in one or more data centers. Private IP addresses 916 may be associated with the resource instances 912; the private IP addresses are the internal network addresses of the resource instances 912 on the provider network 900. In some embodiments, the provider network 900 may also provide public IP addresses 914 and/or public IP address ranges (e.g., Internet Protocol version 4 (IPv4) or Internet Protocol version 6 (IPv6) addresses) that clients may obtain from the provider 900.

Conventionally, the provider network 900, via the virtualization services 910, may allow a client of the service provider (e.g., a client that operates client network 950A) to dynamically associate at least some public IP addresses 914 assigned or allocated to the client with particular resource instances 912 assigned to the client. The provider network 900 may also allow the client to remap a public IP address 914, previously mapped to one virtualized computing resource instance 912 allocated to the client, to another virtualized computing resource instance 912 that is also allocated to the client. Using the virtualized computing resource instances 912 and public IP addresses 914 provided by the service provider, a client of the service provider such as the operator of client network 950A may, for example, implement client-specific applications and present the client's applications on an intermediate network 940, such as the Internet. Other network entities 920 on the intermediate network 940 may then generate traffic to a destination public IP address 914 published by the client network 950A; the traffic is routed to the service provider data center, and at the data center is routed, via a network substrate, to the private IP address 916 of the virtualized computing resource instance 912 currently mapped to the destination public IP address 914. Similarly, response traffic from the virtualized computing resource instance 912 may be routed via the network substrate back onto the intermediate network 940 to the source entity 920.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include network devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance.

Some public IP addresses may be assigned by the provider network infrastructure to particular resource instances; these public IP addresses may be referred to as standard public IP addresses, or simply standard IP addresses. In at least some embodiments, the mapping of a standard IP address to a private IP address of a resource instance is the default launch configuration for all resource instance types.

At least some public IP addresses may be allocated to or obtained by clients of the provider network 900; a client may then assign their allocated public IP addresses to particular resource instances allocated to the client. These public IP addresses may be referred to as client public IP addresses, or simply client IP addresses. Instead of being assigned by the provider network 900 to resource instances as in the case of standard IP addresses, client IP addresses may be assigned to resource instances by the clients, for example via an API provided by the service provider. Unlike standard IP addresses, client IP Addresses are allocated to client accounts and can be remapped to other resource instances by the respective clients as necessary or desired. A client IP address is associated with a client's account, not a particular resource instance, and the client controls that IP address until the client chooses to release it. Unlike conventional static IP addresses, client IP addresses allow the client to mask resource instance or availability zone failures by remapping the client's public IP addresses to any resource instance associated with the client's account. The client IP addresses, for example, enable a client to engineer around problems with the client's resource instances or software by remapping client IP addresses to replacement resource instances.

FIG. 9 illustrates an example data center that implements an overlay network on a network substrate using IP tunneling technology, according to at least some embodiments. A provider data center 1000 may include a network substrate that includes networking devices 1012 such as routers, switches, network address translators (NATs), and so on. At least some embodiments may employ an Internet Protocol (IP) tunneling technology to provide an overlay network via which encapsulated packets may be passed through network substrate 1010 using tunnels. The IP tunneling technology may provide a mapping and encapsulating system for creating an overlay network on a network (e.g., a local network in data center 1000 of FIG. 9) and may provide a separate namespace for the overlay layer (the public IP addresses) and the network substrate 1010 layer (the private IP addresses). Packets in the overlay layer may be checked against a mapping directory (e.g., provided by mapping service 1030) to determine what their tunnel substrate target (private IP address) should be. The IP tunneling technology provides a virtual network topology (the overlay network); the interfaces (e.g., service APIs) that are presented to clients are attached to the overlay network so that when a client provides an IP address to which the client wants to send packets, the IP address is run in virtual space by communicating with a mapping service (e.g., mapping service 1030) that knows where the IP overlay addresses are.

In at least some embodiments, the IP tunneling technology may map IP overlay addresses (public IP addresses) to substrate IP addresses (private IP addresses), encapsulate the packets in a tunnel between the two namespaces, and deliver the packet to the correct endpoint via the tunnel, where the encapsulation is stripped from the packet. In FIG. 9, an example overlay network tunnel 1034A from a virtual machine (VM) 1024A on host 1020A to a device on the intermediate network 1050 and an example overlay network tunnel 1034B between a VM 1024B on host 1020B and a VM 1024C on host 1020C are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (private IP address) of a packet before sending, and stripped from the packet address upon receiving. As an example, the overlay network may be implemented using 32-bit IPv4 (Internet Protocol version 4)

addresses as the public IP addresses, and the IPv4 addresses may be embedded as part of 128-bit IPv6 (Internet Protocol version 6) addresses used on the substrate network as the private IP addresses.

Referring to FIG. 9, at least some networks in which embodiments may be implemented may include hardware virtualization technology that enables multiple operating systems to run concurrently on a host computer (e.g., hosts 1020A and 1020B of FIG. 9), i.e. as virtual machines (VMs) 1024 on the hosts 1020. The VMs 1024 may, for example, be rented or leased to clients of a network provider. A hypervisor, or virtual machine monitor (VMM) 1022, on a host 1020 presents the VMs 1024 on the host with a virtual platform and monitors the execution of the VMs 1024. Each VM 1024 may be provided with one or more private IP addresses; the VMM 1022 on a host 1020 may be aware of the private IP addresses of the VMs 1024 on the host. A mapping service 1030 may be aware of all network IP prefixes and the IP addresses of routers or other devices serving IP addresses on the local network. This includes the IP addresses of the VMMs 1022 serving multiple VMs 1024. The mapping service 1030 may be centralized, for example on a server system, or alternatively may be distributed among two or more server systems or other devices on the network. A network may, for example, use the mapping service technology and IP tunneling technology to, for example, route packets between VMs 1024 on different hosts 1020 within the data center 1000 network; note that an interior gateway protocol (IGP) may be used to exchange routing information within such a local network.

In addition, a network such as the provider data center 1000 network (which is sometimes referred to as an autonomous system (AS)) may use the mapping service technology, IP tunneling technology, and routing service technology to route packets from the VMs 1024 to Internet destinations, and from Internet sources to the VMs 1024. Note that an external gateway protocol (EGP) or border gateway protocol (BGP) is typically used for Internet routing between sources and destinations on the Internet. FIG. 9 shows an example provider data center 1000 implementing a network that provides resource virtualization technology and that provides full Internet access via edge router(s) 1014 that connect to Internet transit providers, according to at least some embodiments. The provider data center 1000 may, for example, provide clients the ability to implement virtual computing systems (VMs 1024) via a hardware virtualization service and the ability to implement virtualized data stores 1016 on storage resources 1018 via a storage virtualization service.

The data center 1000 network may implement IP tunneling technology, mapping service technology, and a routing service technology to route traffic to and from virtualized resources, for example to route packets from the VMs 1024 on hosts 1020 in data center 1000 to Internet destinations, and from Internet sources to the VMs 1024. Internet sources and destinations may, for example, include computing systems 1070 connected to the intermediate network 1040 and computing systems 1052 connected to local networks 1050 that connect to the intermediate network 1040 (e.g., via edge router(s) 1014 that connect the network 1050 to Internet transit providers). The provider data center 1000 network may also route packets between resources in data center 1000, for example from a VM 1024 on a host 1020 in data center 1000 to other VMs 1024 on the same host or on other hosts 1020 in data center 1000.

A service provider that provides data center 1000 may also provide additional data center(s) 1060 that include hardware virtualization technology similar to data center 1000 and that may also be connected to intermediate network 1040. Packets may be forwarded from data center 1000 to other data centers 1060, for example from a VM 1024 on a host 1020 in data center 1000 to another VM on another host in another, similar data center 1060, and vice versa.

While the above describes hardware virtualization technology that enables multiple operating systems to run concurrently on host computers as virtual machines (VMs) on the hosts, where the VMs may be rented or leased to clients of the network provider, the hardware virtualization technology may also be used to provide other computing resources, for example storage resources 1018, as virtualized resources to clients of a network provider in a similar manner.

Figure 10:
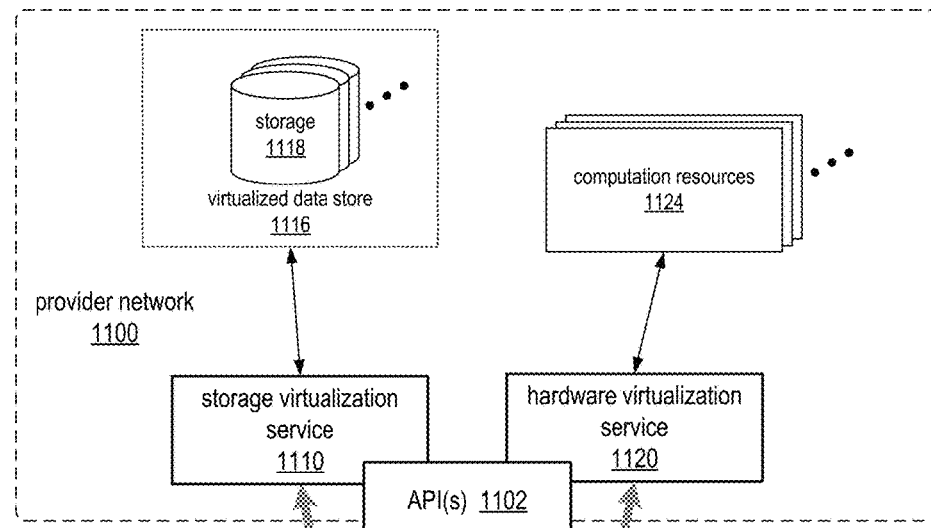
FIG. 10 is a block diagram of an example provider network that provides a storage virtualization service and a hardware virtualization service to clients, according to at least some embodiments.
Figure 10:
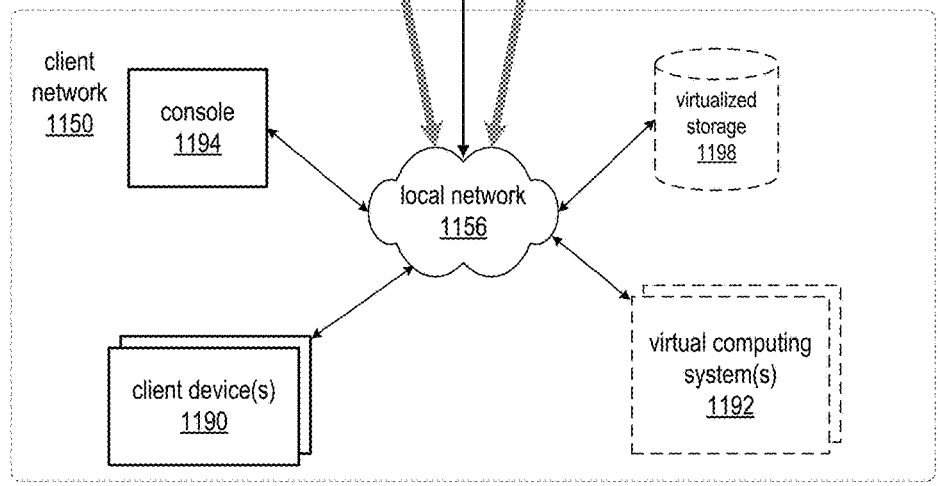

FIG. 10 is a block diagram of an example provider network that provides a storage virtualization service and a hardware virtualization service to clients, according to at least some embodiments. Hardware virtualization service 1120 provides multiple computation resources 1124 (e.g., VMs) to clients. The computation resources 1124 may, for example, be rented or leased to clients of the provider network 1100 (e.g., to a client that implements client network 1150). Each computation resource 1124 may be provided with one or more private IP addresses. Provider network 1100 may be configured to route packets from the private IP addresses of the computation resources 1124 to public Internet destinations, and from public Internet sources to the computation resources 1124.

Provider network 1100 may provide a client network 1150, for example coupled to intermediate network 1140 via local network 1156, the ability to implement virtual computing systems 1192 via hardware virtualization service 1120 coupled to intermediate network 1140 and to provider network 1100. In some embodiments, hardware virtualization service 1120 may provide one or more APIs 1102, for example a web services interface, via which a client network 1150 may access functionality provided by the hardware virtualization service 1120, for example via a console 1194. In at least some embodiments, at the provider network 1100, each virtual computing system 1192 at client network 1150 may correspond to a computation resource 1124 that is leased, rented, or otherwise provided to client network 1150.

From an instance of a virtual computing system 1192 and/or another client device 1190 or console 1194, the client may access the functionality of storage virtualization service 1110, for example via one or more APIs 1102, to access data from and store data to a virtual data store 1116 provided by the provider network 1100. In some embodiments, a virtualized data store gateway (not shown) may be provided at the client network 1150 that may locally cache at least some data, for example frequently accessed or critical data, and that may communicate with virtualized data store service 1110 via one or more communications channels to upload new or modified data from a local cache so that the primary store of data (virtualized data store 1116) is maintained. In at least some embodiments, a user, via a virtual computing system 1192 and/or on another client device 1190, may mount and access virtual data store 1116 volumes, which appear to the user as local virtualized storage 1198.

While not shown in FIG. 10, the virtualization service(s) may also be accessed from resource instances within the provider network 1100 via API(s) 1102. For example, a client, appliance service provider, or other entity may access a virtualization service from within a respective private network on the provider network 1100 via an API 1102 to request allocation of one or more resource instances within the private network or within another private network.

FIG. 11 illustrates an example provider network that provides private networks on the provider network to at least some clients, according to at least some embodiments. A client's virtualized private network 1260 on a provider network 1200, for example, enables a client to connect their existing infrastructure (e.g., devices 1252) on client network 1250 to a set of logically isolated resource instances (e.g., VMs 1224A and 1224B and storage 1218A and 1218B), and to extend management capabilities such as security services, firewalls, and intrusion detection systems to include their resource instances.

A client's virtualized private network 1260 may be connected to a client network 1250 via a private communications channel 1242. A private communications channel 1242 may, for example, be a tunnel implemented according to a network tunneling technology or some other technology over an intermediate network 1240. The intermediate network may, for example, be a shared network or a public network such as the Internet. Alternatively, a private communications channel 1242 may be implemented over a direct, dedicated connection between virtualized private network 1260 and client network 1250.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In embodiments, either a shared network or a public network may serve as an intermediate network between a provider network and a client network.

To establish a virtualized private network 1260 for a client on provider network 1200, one or more resource instances (e.g., VMs 1224A and 1224B and storage 1218A and 1218B) may be allocated to the virtualized private network 1260. Note that other resource instances (e.g., storage 1218C and VMs 1224C) may remain available on the provider network 1200 for other client usage. A range of public IP addresses may also be allocated to the virtualized private network 1260. In addition, one or more networking devices (routers, switches, etc.) of the provider network 1200 may be allocated to the virtualized private network 1260. A private communications channel 1242 may be established between a private gateway 1262 at virtualized private network 1260 and a gateway 1256 at client network 1250.

In at least some embodiments, in addition to, or instead of, a private gateway 1262, virtualized private network 1260 may include a public gateway 1264 that enables resources within virtualized private network 1260 to communicate directly with entities (e.g., network entity 1244) via intermediate network 1240, and vice versa, instead of or in addition to via private communications channel 1242.

Virtualized private network 1260 may be, but is not necessarily, subdivided into two or more subnetworks, or subnets, 1270. For example, in implementations that include both a private gateway 1262 and a public gateway 1264, the private network may be subdivided into a subnet 1270A that includes resources (VMs 1224A and storage 1218A, in this example) reachable through private gateway 1262, and a subnet 1270B that includes resources (VMs 1224B and storage 1218B, in this example) reachable through public gateway 1264.

The client may assign particular client public IP addresses to particular resource instances in virtualized private network 1260. A network entity 1244 on intermediate network 1240 may then send traffic to a public IP address published by the client; the traffic is routed, by the provider network 1200, to the associated resource instance. Return traffic from the resource instance is routed, by the provider network 1200, back to the network entity 1244 over intermediate network 1240. Note that routing traffic between a resource instance and a network entity 1244 may require network address translation to translate between the public IP address and the private IP address of the resource instance.

At least some embodiments may allow a client to remap public IP addresses in a client's virtualized private network 1260 as illustrated in FIG. 11 to devices on the client's external network 1250. When a packet is received (e.g., from network entity 1244), the network 1200 may determine that the destination IP address indicated by the packet has been remapped to an endpoint on external network 1250 and handle routing of the packet to the respective endpoint, either via private communications channel 1242 or via the intermediate network 1240. Response traffic may be routed from the endpoint to the network entity 1244 through the provider network 1200, or alternatively may be directly routed to the network entity 1244 by the client network 1250. From the perspective of the network entity 1244, it appears as if the network entity 1244 is communicating with the public IP address of the client on the provider network 1200. However, the network entity 1244 has actually communicated with the endpoint on client network 1250.

While FIG. 11 shows network entity 1244 on intermediate network 1240 and external to provider network 1200, a network entity may be an entity on provider network 1200. For example, one of the resource instances provided by provider network 1200 may be a network entity that sends traffic to a public IP address published by the client.

FIG. 12 illustrates subnets and security groups in an example virtual private network implementation on a provider network, according to at least some embodiments. In at least some embodiments, a provider network such as provider network 1200 in FIG. 11 may allow the client to establish and manage virtual security groups 1316 within the client's virtual private network 1310, within or across subnets 1314. A security group 1316 acts as a virtual firewall that controls the traffic allowed to reach one or more resource instances 1318 within the security group 1316. The client may establish one or more security groups 1316 within the private network 1310, and may associate each resource instance 1318 in the private network 1310 with one or more of the security groups 1316. In at least some embodiments, the client may establish and/or modify rules for each security group 1316 that control the inbound traffic allowed to reach the resource instances 1318 associated with the security group 1316.

In the example virtual private network 1310 shown in FIG. 12, the private network 1310 is subdivided into two subnets 1314A and 1314B. Access to the private network 1310 is controlled by gateway(s) 1330. Each subnet 1314 may include at least one router 1312 that acts to route traffic to (and from) resource instances 1318 on the respective subnet 1314. In some embodiments, network access control lists (ACLs) may be used to control access to the subnets 1314 at router(s) 1312. In the example shown in FIG. 12, resource instances 1318A through 1318E are on subnet 1314A, and resource instances 1318F through 1318J are on subnet 1314B. The client has established four security groups 1316A through 1316D. As shown in FIG. 12, a security group may extend across subnets 1314, as does security group 1316A that includes resource instances 1318A and 1318B on subnet 1314A and resource instance 1318F on subnet 1314B. In addition, a resource instance 1318 may be included in two or more security groups 1316, as is resource instance 1318A which is included in security group 1316A and 1316B.

Illustrative System

In at least some embodiments, a server that implements a portion or all of the methods and apparatus for integrating client devices with client private networks in provider network environments as described herein may include a general-purpose computer system that includes or is configured to access one or more computer-accessible media, such as computer system 2000 illustrated in FIG. 13. In the illustrated embodiment, computer system 2000 includes one or more processors 2010 coupled to a system memory 2020 via an input/output (I/O) interface 2030. Computer system 2000 further includes a network interface 2040 coupled to I/O interface 2030.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store instructions and data accessible by processor(s) 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for integrating client devices with client private networks in provider network environments, are shown stored within system memory 2020 as code 2025 and data 2026.

In one embodiment, I/O interface 2030 may be configured to coordinate I/O traffic between processor 2010, system memory 2020, and any peripheral devices in the device, including network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices 2060 attached to a network or networks 2050, such as other computer systems or devices as illustrated in FIGS. 1 through 12, for example. In various embodiments, network interface 2040 may support communication via any suitable wired or wireless general data networks, such as types of Ethernet network, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a computer-accessible medium configured to store program instructions and data as described above for FIGS. 1 through 12 for implementing embodiments of methods and apparatus for integrating client devices with client private networks in provider network environments. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 2000 via I/O interface 2030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a provider network comprising a plurality of host devices implementing a plurality of resources;
a private network implemented on the provider network and containing a subset of the plurality of resources, wherein the private network implements an address space comprising a range of network addresses, wherein the resources of the private network are assigned network addresses within the address space, and wherein the private network is configured to control access to the resources of the private network by entities external to the private network;
a network device comprising two or more ports and implementing private network control plane functionality configured to integrate external client devices with private networks on the provider network, the network device configured to:
connect to a client device external to the provider network via a first port;
connect to the private network via a second port facing the provider network;
assign a network address within the address space of the private network to the client device;
receive packets from the client device via the first port;
encapsulate the packets according to the private network control plane functionality to integrate the client device with the private network on the provider network; and
route the encapsulated packets onto the private network via the second port.

2. The system as recited in claim 1, wherein the network device is further configured to:
receive encapsulated packets from the private network via the second port;
decapsulate the packets; and
send the packets to the client device via the first port.

3. The system as recited in claim 1, further comprising one or more computing devices implementing a private network service and an application programming interface (API) to the private network service, wherein the private network service is configured to receive input from a client via the API to:
implement the private network on the provider network;
configure and manage the resources on the private network;
configure and manage the client device connected to the private network via the network device as a resource on the private network; and
implement access control for the resources and the client device on the private network.

4. The system as recited in claim 1, wherein the network device and the client device are located in a service provider data center that contains the provider network.

5. The system as recited in claim 4, wherein the network device is one of a plurality of network devices in the service provider data center each implementing private network control plane functionality to integrate external client devices with private networks on the provider network and each comprising one or more ports facing the provider network and one or more ports facing an external network.

6. The system as recited in claim 1, wherein the network device and the client device are located in a data center of a client associated with the private network, and wherein the provider network is located in a data center of a service provider.

7. The system as recited in claim 6, wherein the first port of the network device is connected to the private network via a secure connection between the data centers.

8. A method, comprising:
receiving, at a network device coupled to a provider network, packets from a client device external to the provider network;
encapsulating the packets according to private network control plane functionality implemented on the network device for communication to a private network implemented on the provider network;
routing the encapsulated packets onto the private network implemented on the provider network, wherein the private network implements an address space on the provider network, wherein the address space comprises a range of network addresses, and wherein the client device is assigned a network address within the address space of the private network;
receiving encapsulated packets from the private network, wherein at least some of the packets are targeted at the network address assigned to the client device;
decapsulating the packets; and
sending the decapsulated packets targeted at the network address to the client device.

9. The method as recited in claim 8, wherein the provider network includes a plurality of host devices implementing a plurality of resources, wherein the private network contains a subset of the plurality of resources assigned network addresses within the address space of the private network, and wherein the private network is configured to control access to the resources of the private network including the client device by entities external to the private network.

10. The method as recited in claim 8, wherein the network device and the client device are located in a service provider data center that contains the provider network.

11. The method as recited in claim 8, wherein the network device and the client device are located in a data center of a client associated with the private network, and wherein the provider network is located in a data center of a service provider.

12. The method as recited in claim 11, wherein the network device is connected to the private network via a secure connection between the data centers.

13. The method as recited in claim 11, further comprising:
receiving, at the network device, packets from a plurality of client devices located in the data center of the client, wherein the client devices are assigned network addresses within the address space of the private network; and
configuring at least some of the plurality of client devices as resources within the private network in response to the received packets.

14. The method as recited in claim 13, wherein said configuring at least some of the plurality of client devices as resources within the private network in response to the received packets comprises sending information about the client devices including the network addresses assigned to the client devices to one or more services of the provider network.

15. The method as recited in claim 8, further comprising configuring and managing one or more resources on the private network including the client device according to client input to an application programming interface (API) to a private network service of the provider network.

16. A network device, comprising:
one or more ports facing a provider network comprising a plurality of host devices implementing a plurality of resources;
one or more ports facing an external network; and
private network control plane functionality configured to integrate external client devices with private networks on the provider network;
wherein the network device is configured to:
connect to a client device external to the provider network via a first port facing the external network;
connect to a private network on the provider network via a second port facing the external network, wherein the private network implements an address space on the provider network comprising a range of network addresses, and wherein the client device has a network address within the address space of the private network;
receive packets from the client device via the first port;
encapsulate the packets according to the private network control plane functionality to integrate the client device with the private network on the provider network; and
route the encapsulated packets onto the private network via the second port.

17. The network device as recited in claim 16, wherein the network device is further configured to:
receive encapsulated packets from the private network via the second port;
decapsulate the packets; and
send the packets to the client device via the first port.

18. The network device as recited in claim 16, wherein the network device and the client device are located in a service provider data center that contains the provider network.

19. The network device as recited in claim 16, wherein the network device and the client device are located in a data center of a client associated with the private network, and wherein the provider network is located in a data center of a service provider.

20. The network device as recited in claim 19, wherein the network device is further configured to:
receive packets from a plurality of client devices located in the data center of the client, wherein the client devices are assigned network addresses within the address space of the private network; and
communicate with one or more services of the provider network to dynamically configure at least some of the plurality of client devices as resources within the private network in response to the received packets.

* * * * *